UNITED STATES PATENT OFFICE.

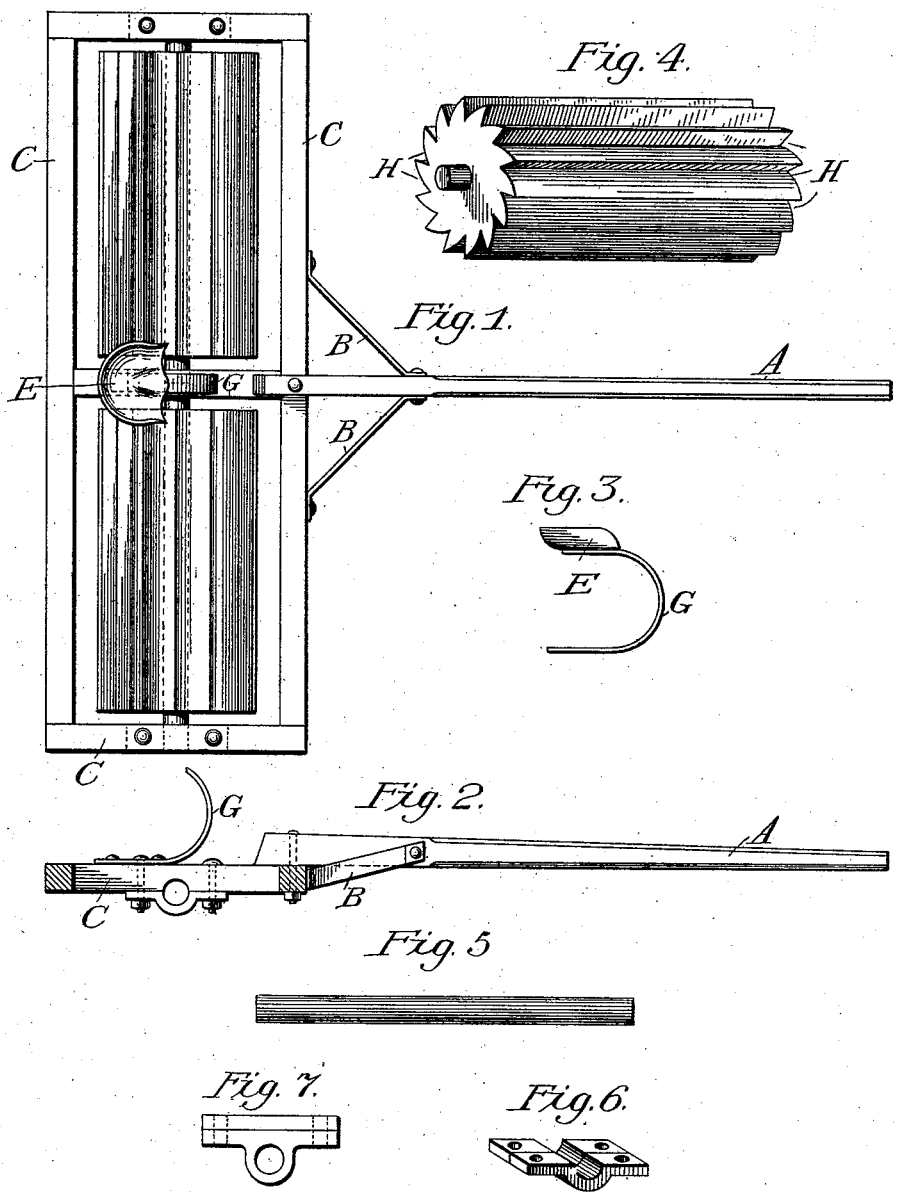

LANSFORD CHAMBERS, OF BARTLETT, IOWA.

COMBINED DIRT ROLLER AND PULVERIZER.

SPECIFICATION forming part of Letters Patent No. 605,160, dated June 7, 1898.

Application filed May 23, 1896. Serial No. 592,893. (No model.)

*To all whom it may concern:*

Be it known that I, LANSFORD CHAMBERS, a citizen of the United States, residing at Bartlett, in the county of Fremont and State of Iowa, have invented a new and useful Combined Dirt Roller and Pulverizer, of which the following is a specification.

My invention relates to a new and improved machine in which there are two cast-iron fluted cylindrical reversible rollers operating and revolving upon the ground in such a manner as to crush clods, tear up and pulverize the ground by loosening it up when reversed and when thrown in opposite direction to smooth the same.

The objects of my invention are, first, to pulverize and crush the soil as the rollers revolve on the ground in one direction by pushing back the dirt and pulling up and destroying all vegetation, making the ground mellow and freeing it from clods instead of crushing them into the ground as a simple roller would do; second, when the rollers are reversed (the clods having been pulverized by the use of the pulverizer) they operate to make the ground smooth and level, and when used on ground planted with corn or small grain it is left in good shape for the use of the cultivator. I attain these objects by the mechanism illustrated in the accompanying drawings, in which—

Figure 1 is a top plan of the entire machine. Fig. 2 is a longitudinal section of the tongue and frame; Fig. 3, a view of the seat attached to the steel spring, by which the same is attached to the frame, as shown in Fig. 1. Fig. 4 is a perspective of one of the cylindrical fluted cast-iron rollers. Fig. 5 is the shaft which passes through the roller and is attached to each end and to the frame, as shown in Fig. 1. Fig. 6 is a detail of the iron lubricating-box, in which the two shafts rest in the center of the machine, as shown in Fig. 2; and Fig. 7 is a detail of the single boxes attached to the frame at the outer ends of the shaft.

Similar letters on the drawings refer to similar parts of the machine throughout the views.

As shown in Fig. 1, the framework C of the machine is composed of two wooden bars at right angles to the tongue and located one behind the other and connected at their ends and center by shorter bars, which comprise a rectangular frame adapted to receive the two rollers, as clearly shown in Fig. 1. The rollers are attached to the frame at each of the outer ends by the single boxes, Fig. 7, and in the middle by a double lubricating-box, Fig. 6, each of which is securely bolted to the frame C. The rollers are attached to the frame by means of the shaft passing through the rollers and resting in the boxes. To the frame C is secured the tongue A, and bolted to the frame and tongue are two iron braces B B for the purpose of holding said tongue securely in place and strengthening the attachment of said tongue to the machine. The cylindrical rollers are made of cast-iron and provided with concaved flutes H one and three-fourths inches deep, four inches between each flute, and fourteen flutes in each roller. The rollers when attached to the machine for use are about six inches apart and placed end to end, as shown in Fig. 1 of the drawings. The steel spring by which the seat is attached to the framework is simply a piece of spring-steel bent for the purpose of forming a support to the driver's seat. The two rollers are reversed by unbolting the boxing at each end of the roller and turning them half around or changing the ends of the shaft through the rollers in the boxing. The rollers are securely keyed to the shaft and held from revolving thereon.

Having described my invention, what I now claim, and desire to secure by Letters Patent, is—

A combined land roller and pulverizer comprising a cylindrical body or bodies, the surface of which is fluted, thereby forming longitudinal crushing blades or bars arranged tangentially mounted in a suitable supporting-frame provided with a draft device whereby when the roller is drawn in one direction the soil is cut and pulverized, and in the reverse direction the soil is smoothed, substantially as described.

LANSFORD CHAMBERS.

Witnesses:
 FRANK C. CHASE,
 JOHN B. STATLER.